United States Patent [19]

Seaver

[11] Patent Number: 4,822,135
[45] Date of Patent: Apr. 18, 1989

[54] OPTICAL WAVE GUIDE BAND EDGE SENSOR AND METHOD

[76] Inventor: George Seaver, 19 Mystery La., Cataumet, Bourne, Mass. 02534

[21] Appl. No.: 83,691

[22] Filed: Aug. 7, 1987

[51] Int. Cl.⁴ .............................................. G01N 21/17
[52] U.S. Cl. .................................. 350/96.29; 73/800; 250/227; 356/73.1
[58] Field of Search .................... 356/73.1; 350/96.29; 250/227, 231 R; 73/800

[56] References Cited

U.S. PATENT DOCUMENTS

| | | | |
|---|---|---|---|
| 4,294,513 | 10/1981 | Nelson et al. | 350/96.29 |
| 4,367,040 | 1/1983 | Goto | 350/96.1 X |
| 4,530,078 | 7/1985 | Lagakos et al. | 350/96.29 X |
| 4,546,466 | 10/1985 | Lopiccolo | 455/612 X |
| 4,581,730 | 4/1986 | Ozeki et al. | 350/96.15 X |
| 4,633,079 | 12/1986 | Rieger | 350/96.29 X |
| 4,636,070 | 1/1987 | Ide | 356/73.1 |
| 4,657,388 | 4/1987 | Coppa et al. | 356/73.1 |
| 4,678,903 | 7/1987 | Wlodarczyk et al. | 350/96.29 X |
| 4,703,174 | 10/1987 | Anderson et al. | 250/227 |

OTHER PUBLICATIONS

Davis, "Fiber Optic Sensors: An Overview", SPIE, vol. 478, Fiber Optic and Laser Sensors II, May 1984, pp. 12–18 (The International Society for Optical Engineering—Proceedings).

Primary Examiner—John D. Lee
Attorney, Agent, or Firm—Richard P. Crowley

[57] ABSTRACT

An optical wave guide sensor which comprises: a broad-band, radiant energy source; an optical wave guide, such as an optical fiber, rectangular slab or thin film, having a guiding interface and an inlet an outlet, the inlet receiving the radiant energy and the wave guide deformable from one part to another of the guide; and a spectral intensity detector at the wave guide outlet to measure the change in the wavelength of the energy critically reflected from the guiding interface on deformation of the wave guide. A method of measuring the deformation of an optical wave guide and/or a parameter causing such deformation, which method comprises: measuring the change in the mode band edge critical wavelength of the first, second or higher mode of the radiant energy throughput of the wave guide as a function of the deformation of the wave guide.

18 Claims, 2 Drawing Sheets

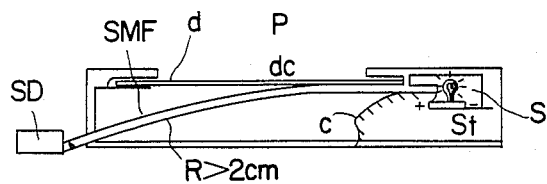
FIG. 6
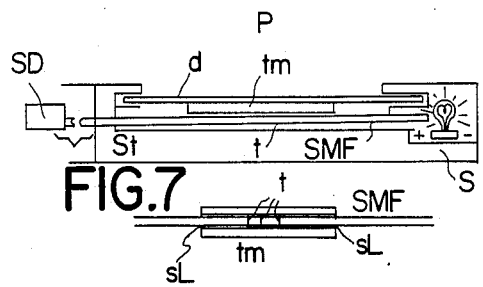
FIG. 7
FIG. 8
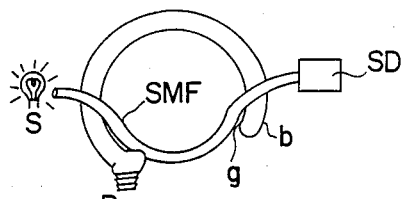
FIG. 9
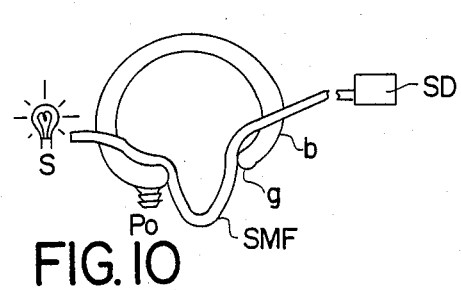
FIG. 10
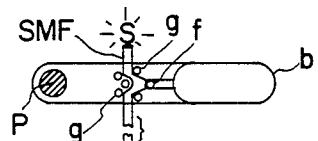
FIG. 11
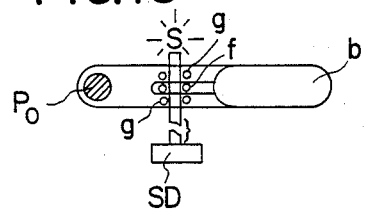
FIG. 12
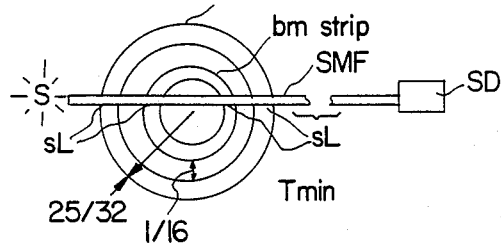
FIG. 13
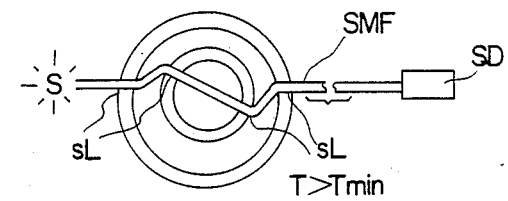
FIG. 14
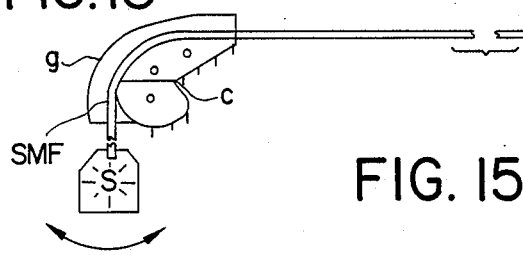
FIG. 15

OPTICAL WAVE GUIDE BAND EDGE SENSOR AND METHOD

BACKGROUND OF THE INVENTION

Fiber optic amplitude sensing, where the measurement is determined by the intensity of the returned light beam in an optical fiber, has been in use for some time; however, connector and bending losses, particularly in harsh environs, make such sensing inaccurate. Another technique in use is phase modulation, but this too is sensitive to the environment and is costly. This application describes a technique for the modulation of an optical beam by wavelength or color; specifically, the optical sensor described is a filter whose spectral band edge is a function of the parameter to be measured. This general class of optical sensors was first established by Christensen[1] with a transmission/absorption spectral filter and band edge in GaAs designed to measure temperature. Quick, James and Coker[2] developed a spectral line resonance filter using a broad-band source, optical fibers and a Fabry-Perot interferometric cavity to measure temperature; Lewis[3] at Litton Poly-Scientific used a broad-band source, optical fibers, and color filters to determine rotary position. Also, Knox, Marshall and Murray[4] used a broad-band source, a monochromator, and birefringent filter to measure temperature; Jones and Spooncer[5] used a broad-band source, a monochromator, and birefringent filter to measure pressure. Finally, Seaver[6,7,8] established the critical reflection/transmission filter and band edge technique to measure the index of refraction (1987) and temperature (1986).

When an optical beam is incidence upon a surface at or greater than the critical angle, it is totally reflected. At angles less than critical, it is little reflected, and the transition between these two conditions is very abrupt. This is the principle of critical angle optical sensing. Historically, this has been used by measuring the angle of incidence of a single, or narrow, wavelength beam at critical reflection. This became the Abbe critical angle refractometer[9] for measuring the index of refraction of a test fluid. More recently, Seaver[6] held the angle constant and measured the wavelength at critical reflection. This is the critical wavelength refractometer for measuring the index of refraction of a test material.

SUMMARY OF THE INVENTION

The present invention relates to a guided wave band edge sensor apparatus and method for determining the curvature or deformation of a sensing interface. In particular, the invention concerns a single mode optical fiber (SMF) sensor apparatus and method for measuring the deformation and/or curvature of the optical fiber by measurement of the change in the critical or mode cut-off wavelength of the guided radiant energy passed through the optical fiber.

In this mode band edge sensor, as opposed to the previous critical wavelength refractometer, the materials on either side of a sensing interface, such as an optical fiber wherein the core and cladding form a guiding interface, are known and constant, and the wavelength of the critically reflected guided wave is measured to determine the curvature of the sensing interface. This critical wavelength goniometer is useful in measuring parameters that induce changes in the curvature of a wave guide, such as bends and microbends in optical fibers.

The invention relates to an optical guided wave band edge sensor for the determination of the deformation, such as curvature or bending, of an optical wave guide, such as an optical fiber an optical slab or an optical film. The term wave guide means single and multiple mode optical fibers, rectangular or slab wave guides and, taken together, optical integrated circuits 10. As used herein, the terms critical wavelength, and mode band edge wavelength are used to indicate the wavelength where an abrupt change in reflected intensity occurs. "Critical wavelength" is usually used in the case of a free planar wave incident upon a rectilinear surface (Seaver, Critical Wavelength Refractometer); "cut-off wavelength" is usually used in the case of the band edge of the second mode guided wave in a SMF; and "mode band edge" is used to characterize the cut-off wavelength of higher order guided waves propagating in single or multimode optical wave guides. The term "single mode" fiber means a wave guide that can be used in only one mode.

A sensor apparatus comprises in combination: an optical wave guide means, having an inlet and an outlet to provide a guided optical path for the radiant energy throughput, and which wave guide has a known guiding interface, such as formed by the boundary between the core of an optical fiber and the optical fiber cladding; and also wherein one part of the wave guide is deformable relative to another part of the optical wave guide, that is, for example, the bending of an optical fiber or the movement of one or the other part of an optical guiding slab relative to the total slab. The sensor also includes a broad-band, radiant energy source to provide a radiant energy input to the optical wave guide wherein the sensor further includes a detector to detect the change in critical or band edge wavelength from the output of the optical wave guide of the first, second or higher order mode of the radiant energy so as to determine the amount of deformation of the optical wave guide. The optical wave guide may comprise any guiding radiant energy path means, but typically a single mode optical fiber or optical guiding slab may be used. The detection of the change in the band edge wavelength from the output of the optical wave guide may be by any detector which measures spectral intensities, and more particularly, a spectrograph.

The invention also includes a method of measuring the deformation, such as the bending, occurring of an optical wave guide, such as an optical fiber or slab, and the method comprises: passing broad band, radiant energy through an optical wave guide having a boundary which defines a guiding interface, such as the core and cladding of an optical fiber, the broad-band radiant energy being in the visible and infrared frequency spectrum and capable of being propagated in the first, second, and optionally, in the higher order modes of the optical wave guide. The method includes critically reflecting the radiant energy of the first, second or higher mode from the guiding interface of the optical wave guide and determining the change in this critical or band edge wavelength relative to the deformation of the optical wave guide, such as by measuring the change in spectral intensity, so as to arrive at a measure of the change in curvature of the wave guide.

The method further encompasses inducing the change in deformation of the optical wave guide by the action of a wide variety of parameters through an optical-mechanical coupling with that parameter. For example, the deformation of the optical wave guide may be employed to observe, measure and monitor parameters such as pressure and temperature, such changes brought about by the mechanical movement of a device and thereby leading to endless possible measurement sensor techniques. This method readily converts existing mechanical sensor systems to both local and remote optical sensor systems. The immediate advantages of this conversion are that the output is now immune to electromagnetic interferences, is safer in hazardous environments, and can become part of a fiber optic network.

In the optical fiber application specifically described herein, the technique is applied to the spectral intensities of the first, second and higher modes propagating down a single mode fiber. The criterion for any of the modes to be guided by an optical fiber is that there be total internal reflection at the interface between the fiber core and its cladding; that is, the beam's angle of incidence to the cladding must be equal to or greater than the critical angle of reflection (the critical angle is the complement of one-half of the internal numerical aperture of the fiber). A second criterion for guidance is that the waves constructively interfere. This requires that their angles of incidence decrease with increasing wavelength for a given mode. If the angle of incidence is less than the critical angle, then the mode is "leaky", and its energy is lost to the cladding and the outside environment. Thus, if a white, broad-band source of radiant energy is launched into a single mode fiber, then the first or single mode for all wavelengths will be guided down the straight fiber, as will the second and higher modes up to certain wavelengths. The wavelength where the second mode is no lognger guided is called the cut-off wavelength of a single mode fiber. It is the equivalent of our critical wavelength and marks the point where the angle of incidence to the cladding of the second mode traveling wave drops below the critical angle.

If the radiant energy spectral output of this single mode fiber is observed on a spectrograph (or other apparatus to detect the wavelength change of spectral intensity), the spectral intensities will be seen to increase abruptly by about 100% at a particular wavelength. This again is the cut-off or critical wavelength. Finally, if this single mode optical fiber is then bent or deformed, the angles of incidence to the cladding of all the previously guided radiant energy beams change, some of these beams now exceed the conditions for total internal reflection, and the observed critical wavelength shifts to a shorter value. The amount of this shift is a direct measure of the angular change or deformation of the single mode fiber. This change in the second mode band edge forms the basis for the mode band edge sensing of angle, pressure, displacement and temperature described and claimed herein and represents an improvement over the prior art in both its stability and sensitivity. It also provides an inexpensive and convenient method to convert existing mechanical sensor systems to optical fiber and an optical output.

The invention has been disclosed for the purposes of illustration only in connection with single mode optical fibers as the optical wave guide and in connection with certain illustrative usages; however, it is recognized that various changes, additions, modifications and improvements may be made to the illustrative embodiments, all falling within the spirit and scope of the invention. In particular it is recognized that any optical path wave guide means may be used which is capable of deformation, e.g. bending or curvature of one part of the wave guide relative to another or different part of the wave guide, and that various optical, mechanical and electrical devices may be used in connection with the sensor as described and claimed.

BRIEF DESCRIPTION OF THE DRAWINGS

FIGS. 6–8 shows configurations of the SMF embodiment of FIG. 2 to measure pressure using a diaphragm. In FIG. 6 the diaphragm is used with a cam of increasing curvature to measure low pressure; in FIG. 7 the diaphragm is used with a toothed microbend fitting with FIG. 7 showing a side view and FIG. 8 showing a top view;

FIGS. 9–12 shows two configurations of the SMF embodiment of FIG. 2 to measure pressure using a bourdon tube. In FIGS. 9 and 16 the SMF is in the plane of the tube, and the mode band edge moves to longer wavelength with increasing pressure; in FIGS. 11 and 12 the SMF is perpendicular to the plane of the tube and the band edge moves to shorter $\lambda$;

FIGS. 13 and 14 shows a configuration of the SMF embodiment of FIG. 2 to measure temperature using a bimetallic strip; and FIG. 15 shows a configuration of the SMF configuration of FIG. 2 to measure inclined angle using a cam and gravity.

DESCRIPTION OF THE EMBODIMENTS

This invention is best understood by reference to the drawings wherein like parts are designated with like symbols throughout. The operation of the mode band edge sensor is based upon three principles: the intensity of reflection of an optical beam from a surface changes according to the Fresnel equations very rapidly as the critical angle of reflection is approached; the angle of incidence of a guided beam to the guiding interface decreases as the wavelength increases for a given guided mode; and to a lesser extent, the index of refraction changes differently with wavelength on either side of the guiding/reflecting interface.

Figure 1:
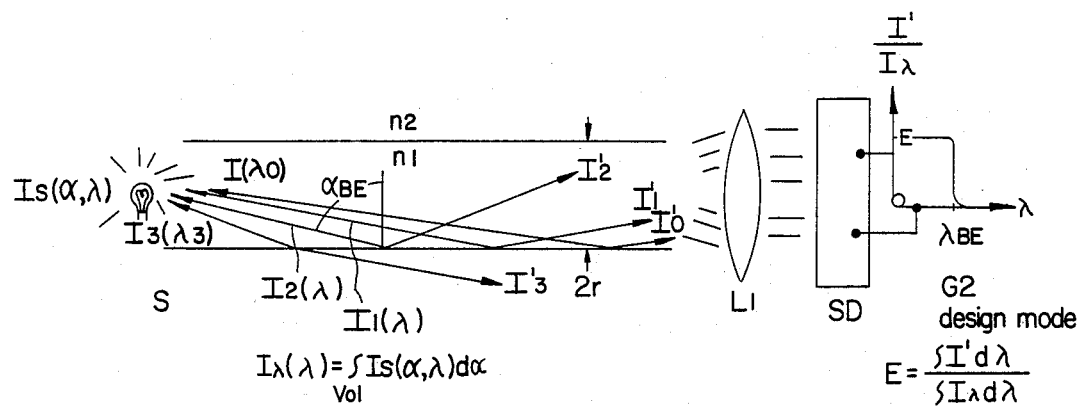
FIG. 1 shows a schematic of the basic principle of the mode band edge snesor in an optical wave guide. A single mode is shown.

Referring now to FIG. 1, the arrows indicated by $I_0$ to $I_3$ represent the radiant spectral energy in a given mode that is incident upon the rectangular or cylindrical interface between materials of indices of refraction $n_1$ and $n_2$. Arrows $I_0^1$, $I_1^1$ and $I_2^1$ indicate the radiant energy that has been internally reflected and guided by interface $n_1/n_2$. The guidance criterion also requires that the individual beams constructively interfere, this interference being after a phase change of one wavelength for the fundamental (single) mode, and two wavelengths for the second mode, etc. For a given mode, this also means that the angle of incidence decreases with increasing wavelength.

In FIG. 1, the arrows $I_3$ and $I_3^1$ represent the radiant energy that is incident at less than the critical angle and is not guided by the interface $n_1$ and $n_2$, whereas $I_2$ and $I_2{}^1$ represent the limits of the guided beams, or the critical angle values. As indicated above, the beams guided at the smaller angles of incidence are of longer wavelength, and this is the case in optical wave guides, optical integrated circuits and in particular, the first, second and higher modes of a single mode optical fiber. Thus, the transition between the guided and unguided radiant energy occurs at a critical wavelength, as well as a critical angle, and represents a spectral band edge.

If a spectral analysis of the throughput, that is, of the reflected and guided radiant energy in beams $I_0{}^1$ to $I_2{}^1$, is done by a spectrograph detector, then an abrupt change in the spectral intensity, as normalized by the source spectral energy, will be observed at a particular wavelength. This is the critical wavelength and called the second mode cut-off wavelength in the case of the first critical value encountered in a SMF.

Figure 2:
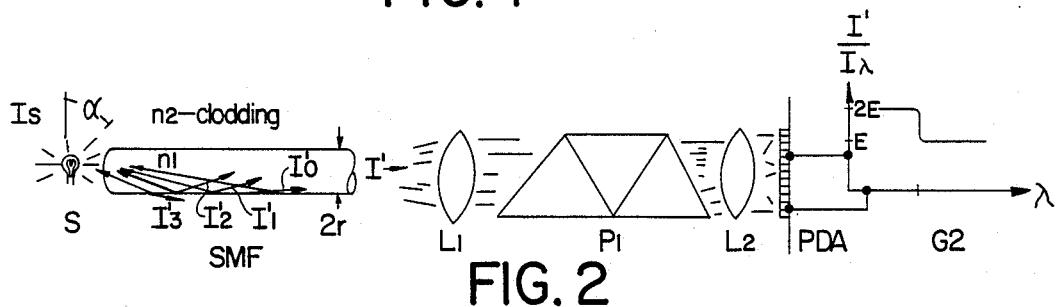
FIG. 2 shows a schematic of the single mode optical fiber (SMF) embodiment of the principle of FIG. 1 for a straight fiber and FIG. 3 for a bent fiber.
Figure 4:
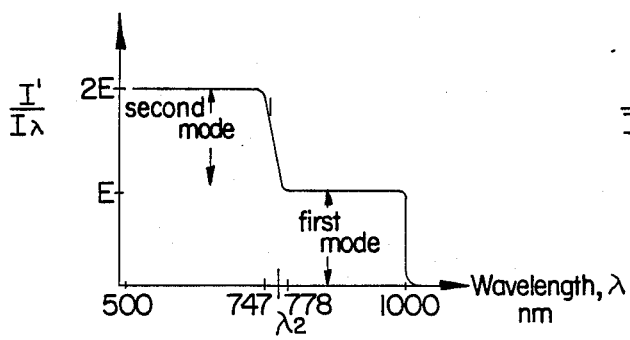
FIG. 4 shows the spectral intensity signal output from the straight SMF of FIG. 2 and FIG. 5 and from the bent SMF of FIG. 3 of FIG. 2. The second mode band edge is where the spectral intensities abruptly change from $\epsilon$ to $2_\epsilon$.
Figure 5:
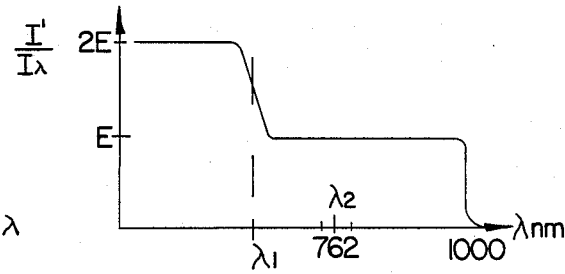

The incandescent source spectral energy of FIG. 1, $I_s$ or $I_\lambda$, usually follows Planck's black-body distribution law for temperature and wavelength, and Lambert's cosine law for angle. The ratio of the total energy carried in the designed modes of an optical fiber to the total energy of the source is, conventionally, the coupling efficiency ($\epsilon$) of the source to optical fiber system. For a SMF, the designed mode is the fundamental mode and, with an incandescent source, $\epsilon$ is also the ratio of the fundamental to source spectral energy (normalized spectral output) as shown in FIGS. 4-5. In practice, the spectral analysis of the SMF throughput can be done by sending $I_0{}^1$ to $I_2{}^1$ through a collimating lens or slit $L_1$, a dispersing prism or grating $p_1$, and a condensing lens $l_2$ as shown in FIG. 2. The condensing lens focuses the image on a photo diode array (PDA), such as a charge coupled device (CCD). If the spectral output of this PDA, $I^1(\lambda)$, is normalized by the spectral intensities contained in the source, $I\lambda (\lambda)$, then as discussed above, an abrupt change in the normalized spectral intensities will be observed at a particular wavelength $\lambda_{BE}$, as shown in the graph G2 of FIG. 1. This is the band edge, the second or high mode cut-off wavelength, or the critical wavelength, depending upon the application.

Figure 3:
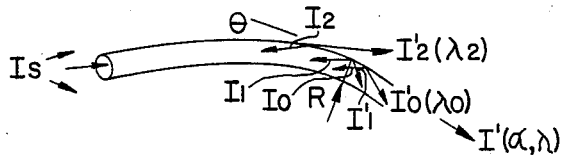

FIGS. 2 and 3 presents a schematic of the single mode optical fiber embodiment of the principle of FIG. 1. A broad-band large numerical aperture source of radiant energy, $I_s (\alpha,\lambda)$, emitting between wavelengths $\lambda 0$ and $\lambda 3$, is launched into the SMF. The guiding structure of a straight SMF allows all source wavelengths to be guided in the first or single mode without exceeding the critical angle, $\alpha BE$; however, only wavelengths up to $\lambda_2$ will be guided in the second mode. The radiant energy in the wavelength range between $\lambda_2$ and $\lambda_3$ of the second mode is lost to the cladding and then to the buffer coating. The SMF acts as a spectral high-pass filter of bias $\epsilon$; it has a band edge $\lambda_{BD}=\lambda_2$. This is shown in FIGS. 2 and 4 for a straight SMF. If the SMF is bent or deformed, as shown in FIG. 3, then the angle of incidence to the cladding of all the guided beams decreases, some angles of incidence now exceed the critical angle, and the interface now only guides the second mode radiant energy up to a wavelength of $\lambda_1$ which is the new second mode band edge wavelength. This is shown in FIG. 5. Wavelength $\lambda_1$ is shorter than $\lambda_2$, and the difference is proportional to the angle through which the SMF has been bent, $\theta$, and its curvature, $1/R$. The values of the second mode band edge wavelength, the core/cladding index of refraction difference, and the core diameter for a typical straight SMF are: $\lambda_{BE}=765$ nm, $n_1-n_2/n_1=0.003$ and $2r=4$ microns.

It is possible to use the band edges of other modes, such as the fundamental, third, fourth and higher modes, as the modulated quantity. However, the band edge of the fundamental (single) mode is less distinct than the other modes and would require significant initial bending of the SMF to be noticeable, and the third mode band edge would occur at about two-thirds the wavelength and less spectral intensity than that of the second mode, although it would be useful in some applications. The following discussion will concern the second mode, although it could apply to other modes as well.

Three are many ways that the SMF of FIGS. 2 and 3 can be configured so that the change in the second mode band edge wavelength can measure pressure, temperature, angular displacement and linear displacement. FIGS. 6-8 presents schematics of two diaphragm configurations of the SMF second mode band edge sensor designed to measure pressure. In FIG. 6, a flexible diaphragm, d, is exposed to the pressure to be measured, P. The SMF sensor is attached with flexible adhesive to the back of the diaphragm extending from within the supporting structure, st, to the diaphragm center, dc. Also extending out from the supporting structure and behind the SMF sensor is a cam, c, whose curvature increases with distance along it. Within the supporting structure and coupled into one end of the SMF sensor is the broad-band source, s. A portion of the SMF after the diaphragm center is free to move to allow movement of the diaphragm; the curvature in this section is less than the initial curvature of cam c. After the free standing section, the SMF passes through the pressure housing to the spectrograph detector, SD. This configuration is designed for low pressures, and has been used to detect blood pressure and pulse in humans.

In FIGS. 7 and 8, a second configuration of the diaphragm SMF pressure sensor is shown in which the variable curvature cam is replaced with a toothed microbend device, tm. The three teeth are contained within a slot, sl, that the SMF runs through. One tooth is connected to a stiff diaghragm and two are anchored to the casing support structure; the points of the teeth are sharp and are separated from each other by a few SMF diameters, this separation determining the pressure sensitivity. A broad-band source, s, is at one end of the SMF, and the other end passes through the SMF sensor housing to the detector, SD. In operation, the stiff diaphragm presses the teeth into the hard coating of the SMF creating microbends. When the pressure is released, the SMF straightens due to its own elasticity.

Another configuration of the SMF second mode sensor that is designed to measure pressure involves the use of a bourdon tube. Referring now to FIGS. 9-12, a C-type bourdon tube is easily adapted to this purpose. In FIGS. 9 and 10, the SMF is attached to the free end of the bourdon tube, b, and also to the stationery end or to the casing so that it is straight when the free end of the bourdon tube has extended under its maximum pressure. As the pressure in the tube is reduced, the free end approaches the stationary end, the SMF is bent in the plane of the tube, and the second mode band edge moves to shorter wavelengths. A laboratory example of this configuration used an SMF of second mode cut-off wavelength at 765 nm. The SMF bridged a distance of one inch when he bourdon tube was under maximum pressure. When the tube was under zero pressure, the free end had move three-eighths of an inch in, thereby causing the SMF to bend to a radius of 0.25 inches, and the second mode band edge (the cut-of) wavelength to move to ~630 nm.

FIGS. 11 and 12 demonstrates a second configuration of the SMF/bourdon tube sensor whereby the SMF enters perpendicularly to the plane of the bourdon tube. This design can sense smaller changes in the position of and pressure in the end of the tube. A narrow finger, that originally moved the mechanical dial, extends from the end of the bourdon tube. When under pressure, this finger pulls the SMF against two stationary guides which are positioned just above and below the finger at an adjustable distance. The guides are part of a jig that screws into the bourdon tube frame and are the only addition to the original gauge. The distance that the guides are separated determines the sensitivity of the optical output. When the pressure in the tube is released and the finger moves back to its zero position, the SMF returns to its zero position through its own elasticity. The SMF is not threaded into place, but rather is maneuvered into place between the guides and finger without requiring access to its ends. A typical example of the output for a SMF of cut-off wavelength 765 nm shows the second mode band edge going from 765 nm to 690 nm for a pressure change from zero to 450 psi (6 psi/nm). If an initial bend in the SMF of seven-eighths inches is set in, the second mode band edge shifts to 733 nm for zero pressure, and the SMF is no longer sensitive to bending external to the bourdon tube.

The basic local pressure devices to be converted to an optical output range from the slack membrane (diaphragm) of $4 \times 10^{-4}$ psi sensitivity to differential pressure, through C-type, spiral-type and helical-type bourdon tubes with a range up to 100,000 psi. The accuracies of these devices range from 2% to 0.1% of full scale, depending upon their design, and are made of copper alloys, AISI 300 series stainless steels, nickel-iron alloys and quartz, depending upon their desired temperature independence, accuracy and cost.

Another configuration of the SMF second mode sensor that is designed to measure temperature involves the use of the conventional bimetallic strip. Referring now to FIGS. 13 and 14 standard helical, bimetal strip thermometer is shown with slots cut into the casing and the end of the strip to convert it for use with an SMF. At the lowest expected temperature, the SMF goes straight through from the slot in the casing through the slot in the top of the bimetal strip, and out the slot in the other side of the casing. As the thermometer strip heats up, it rotates an angle proportional to the temperature change. This puts a bend in the (FIG. 14). The resulting curvature (inverse radius) of the SMF is then proportional to the temperature change. A demonstration of this is provided by FIGS. 13 and 14 in which a Minneapolis-Honeywell seven-coil helical, bimetallic thermostat is used. It rotates through 90° for a temperature change of 160° F. The OD of the bimetal coil is five-eighths of an inch, the OD of the casing is 25/32 of an inch, and the gap between the casing and the helical coil is one-sixteenth of an inch. For a temperature change of 50° F. (28° C.), the wavelength of the band edge of the second mode changes from 765 nm to 695 nm, or 0.7° F./nm (0.4° C./nm).

A configuration of the SMF second mode sensor that is designed to measure angular displacement (an inclinometer) is shown in FIG. 15. A broad-band source launches into the SMF, and both are contained within a weighted housing free to swing to gravity. The other end of the SMF then travels over a cam of monotonically increasing radius of curvature and thence to the spectrograph detector. As the instrument housing and cam swing above the free end of the SMF, the bending radius of the SMF changes, causing the second mode band edge wavelength also to change. Various dampening and averaging mechanisms can be added if oscillations are a problem, and a SMF of 80μ cladding diameter is used to minimize internal fiber stresses and maximize its lifetime.

One example of the spectrograph detector (SD) used to measure the foregoing SMF spectral output is comprised of a collimating microlens (Nippon Sheet Glass, SLN/20) on the end of the SMF, an Amici direct reading dispersing prism, a 50 mm focal length (camera) focusing lens and a 256 pixel linear charged couple device (CCD). This SD is able to resolve to 1 nm in the visible or about 0.5% of the full scale pressure or temperature reading.

Finally, a method is proposed to convert local mechanical pressure, temperature, or other sensors to remote reading optical sensors using optical fiber and various screw-on guides, but grooves and manipulated SMF. Some adhesive may also be employed. This conversion process, in addition to providing a remote optical output, is simple, inexpensive and provides a nonamplitude modulated output. Furthermore, multiple sensors can be wavelength multiplexed in a single multimode fiber by choosing sensing SMF with a different cut-off wavelength and broad-band source for each sensor. Time division multiplexing could further increase the number of sensors remotely read by a single detector. The optical output is safer and more secure than an electrical signal and could become part of a fiber optic network.

REFERENCES (1) Christensen, D., 1979: U.S. Pat. No. 4,136,566.
(2) Quick, W., James, K. and Coker, J., 1983: Fiber Optics Sensing Techniques. First International Conference on Optical Fiber Sensor (FCOFS), London, April, 1983. IEE and OSA. pg. 6.
(3) Lewis, N., 1987: "Fiber optic sensors offer advantages for aircraft." Optical Eng. Repts., June, 1987. SPIE.
(4) Knox, J., Marshall, P. and Murray, R. T., 1983: Birefringent filter temperature sensor. FCOFS, IEE, London, April, 1983. p. 1.
(5) Jones, B. and Spooncer, R., 1983: Photoelastic pressure sensor with optical fiber links using wavelength characterization. FCOFS, IEE, London, April, 1983, p. 173.
(6) Seaver, G., 1987: "Refraction Sensor," U.S. patent Application Ser. No. 719,399, filed Apr. 3, 1985 (now U.S. Pat. No. 4,699,511).
(7) Seaver, G., 1986: "A new refractometer for use in oceanography". Ocean Optics VIII Prodgs., April, 1986. SPIE.
(8) Seaver, G., 1985: "Optical Sensor System", U.S. patent application Ser. No. 719,346, filed Apr. 3, 1985 (now U.S. Pat. No. 4,749,254).
(9) Abbe, Ernst, 1881: "Critical Angle Refractometer".
(10) Unger, H.-G., 1977: *Planar Optical Waveguides and Fibres.* Clarendon Press, Oxford.

What is claimed is:

1. An optical guided wave band edge sensor for the determination of the deformation of an optical wave guide, which sensor comprises:

(a) an optical wave guide means which comprises an optical slab or film having an inlet and an outlet to provide a guided optical path for radiant energy and which wave guide means has a known guiding interface and wherein one part of said interface is physically deformable relative to another part of said interface;

(b) a broad-band, radiant energy means to provide radiant energy to the inlet of the optical wave guide means;

(c) means to deform physically the optical wave guide means; and (d) detecting means to detect continuously the change in the mode critical wavelength of the first, second or higher order, mode from the output of the optical wave guide means in relationship to the change in physical deformation of the optical wave guide means.

2. The sensor of claim 1 wherein the optical wave guide means comprises a single mode optical guiding slab or film.

3. The sensor of claim 1 wherein the detecting means comprises means to measure continuously the change in spectral intensities with wavelength.

4. The sensor of claim 1 wherein the detecting means comprises a spectrographic detector means to measure the spectral intensities output from the wave guide means and which spectrographic detector means comprises a dispersing prism or a diffraction grating, a focusing lens means and a charged, coupled device wherein such means gives the spectral intensity output of the wave guide as a function of wavelength, said spectral intensities subsequently being divided by the input broad-band source spectral intensities, and the resulting normalized spectral intensity output exhibiting an abrupt change in intensity at a particular wavelength, such wavelength being the critical wavelength.

5. The sensor of claim 1 wherein the means to deform includes:

(a) a cam of increasing curvature;

(b) a diaphragm for measuring pressure in which the pressure acts upon said diaphragm;

(c) the diaphragm positioned on movement to deform the optical wave guide means against said cam to cause a change in the critical wavelength with a change in pressure and thereby providing a sensing means for measuring pressure.

6. The sensor of claim 1 wherein the means to deform includes:

(a) a jaw means containing teeth; and (b) a diaphragm for measuring pressure in which the pressure acts upon the said diaphragm, the diaphragm positioned on movement to force the teeth of the jaw means against the optical wave guide means and to deform the optical wave guide means to cause change in the critical wavelength with a change in pressure thereby providing a sensing means for measuring pressure.

7. The sensor of claim 1 wherein the means to deform includes:

a bourdon tube means to measure pressure and wherein the bourdon tube means is positioned to deform the optical wave guide means and to change the critical wavelength with a change in pressure in the bourdon tube thereby providing a sensing means for measuring pressure.

8. The sensor of claim 1 wherein the means to deform includes:

a bimetallic means to measure temperature, the bimetallic means positioned to affect deformation of the optical wave guide means when the bimetallic means changes position due to changes in temperatures thereby providing a means to measure the temperature by the change in the critical wavelength with the change in temperature.

9. The sensor of claim 1 wherein the means to deform includes:

(a) a cam of monotonically changing radius of curvature and wherein said radiant energy source means is secured to and launched into said optical wave guide means at the inlet end and acts as a pendulum; and (b) wherein the optical wave guide means is threaded over the said cam, which cam acts as the pivot of said pendulum and wherein the outlet end of the optical wave guide means is secured to the detecting means whereby as the cam rotates from a vertical and horizontal alignment the optical wave guide means is deformed to cause a change in the critical wavelength thereby providing a sensing means for measurement of the angle of inclination to the vertical.

10. A sensor apparatus for the determination of selected parameters, which apparatus comprises:

(a) an optical wave guide means which comprises a single mode optical fiber having an inlet and an outlet to provide a guided optical path for radiant energy and having a known guiding interface and wherein one part of said optical fiber and said interface is physically deformable relative to another part;

(b) a broad-band radiant energy means to provide radiant energy to the inlet of the optical wave guide means;

(c) moveable means to deform physically the optical wave guide, the movement of said means related to a selected parameter to be measured; and (d) detecting means to detect continuously from the output of the optical wave guide means the change in the critical wavelength of the radiant energy through the change in physical deformation of the optical wave guide means and thereby to measure the selected parameter to be measured.

11. A method for measuring the extent of physical deformation of an optical wave guide which provides a guided optical path for radiant energy and having a known guiding interface and an inlet and an outlet for the radiant energy which method comprises:

(a) passing radiant energy through the optical wave guide from the inlet to the outlet;

(b) deforming physically at least a portion of the optical wave guide and the guiding interface to provide a change in the critical wavelength of the radiant energy in the optical wave guide; and (c) detecting continuously the change in the critical wavelength at the outlet of the optical wave guide as a function of the physical deformation of the optical wave guide.

12. The method of claim 11 wherein the optical wave guide comprises a single mode optical fiber and which includes measuring the change in the critical wavelength caused by the change in the curvature of the optical fiber.

13. The method of claim 11 which includes detecting the change in the critical wavelength by measuring the change in the spectral intensity of the wavelengths from the output of the optical wave guide.

14. The method of claim 11 which includes placing the optical wave guide in a mechanical relationship with a mechanical means to measure a defined parameter and measuring the extent of physical deformation of the optical wave guide due to the change in mechanical position between the optical wave guide and the mechanical means as a determination of the parameter to be measured, thereby allowing the conversion of mechanical measurement systems to a remotely detected optical system.

15. The method of claim 14 which includes employing as the mechanical means a bimetallic element for the measurement of temperature and detecting the change in critical wavelength as a measure of the change in temperature.

16. The method of claim 14 which includes:
employing as the mechanical means a diaphragm or bourdon tube element to measure pressure and detecting the change in critical wavelength as a measure of the change in pressure.

17. The method of claim 14 which includes:
employing as the mechanical means a cam of changing radius of curvature and detecting the change in critical wavelength as a measure of the angle of the optical wave guide inclination to the vertical.

18. The method of claim 11 wherein the optical wave guide comprises a single mode optical fiber.

* * * * *